United States Patent
Chen (10) Patent No.: US 6,412,805 B1
(45) Date of Patent: Jul. 2, 2002

(54) SUPPORT LEG FRAME OF A BICYCLE

(75) Inventor: Ming-Yung Chen, Chang Hua Hsien (TW)

(73) Assignee: Bor Yueh Industries Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/640,071

(22) Filed: Aug. 17, 2000

(51) Int. Cl.$^7$ ................................................. B62H 1/00
(52) U.S. Cl. ...................................................... 280/302
(58) Field of Search .......................... 280/35, 755, 761, 280/763.1, 288.4, 293, 298, 301, 302, 303, 299, 300, 7

(56) References Cited

U.S. PATENT DOCUMENTS

| | | | | |
|---|---|---|---|---|
| 518,698 A | * | 4/1894 | Pipes | 280/301 |
| 530,726 A | * | 12/1894 | Scott | 280/301 |
| 2,082,248 A | * | 6/1937 | Karpel | 280/297 |
| 2,455,312 A | * | 11/1948 | Mueller | 280/301 |
| 2,496,593 A | * | 2/1950 | Morgan | 280/301 |
| 2,553,466 A | * | 5/1951 | Morgan | 74/527 |
| 2,685,452 A | * | 8/1954 | Atwood et al. | 280/301 |
| 3,345,681 A | * | 10/1967 | Pletscher | 16/291 |
| 3,608,929 A | * | 9/1971 | Baginski | 280/301 |
| 3,622,180 A | * | 11/1971 | Humlong | 280/301 |
| 4,069,723 A | * | 1/1978 | Payerle | 74/528 |
| 4,655,472 A | * | 4/1987 | Pletscher | 280/303 |
| 5,607,173 A | * | 3/1997 | Lai | 280/293 |

FOREIGN PATENT DOCUMENTS

EP   0046736   * 3/1982

* cited by examiner

*Primary Examiner*—Paul N. Dickson
*Assistant Examiner*—Laura B. Rosenberg
(74) *Attorney, Agent, or Firm*—Harrison & Egbert (57) ABSTRACT

A support leg frame including a leg, and a mounting seat by which the leg is pivotally mounted on a bicycle frame. The mounting seat is provided with an inverted U-shaped slot which is in turn provided with a cavity containing a plurality of springs. The leg is provided with a pivoting block having a first recess, a second recess, and a cylindrical bar movable between the first recess and the second recess. The leg is pivotally fastened to the mounting seat such that the pivoting block is disposed in the inverted U-shaped slot of the mounting seat, and that the springs are compressed by the cylindrical bar. The springs are concealed in the interior of the mounting seat.

3 Claims, 8 Drawing Sheets

SUPPORT LEG FRAME OF A BICYCLE

BACKGROUND OF THE INVENTION

1. Field of the Invention

The present invention relates generally to a bicycle, and more particularly to a support leg frame of the bicycle.

2. Description of Related Art

Figure 1:
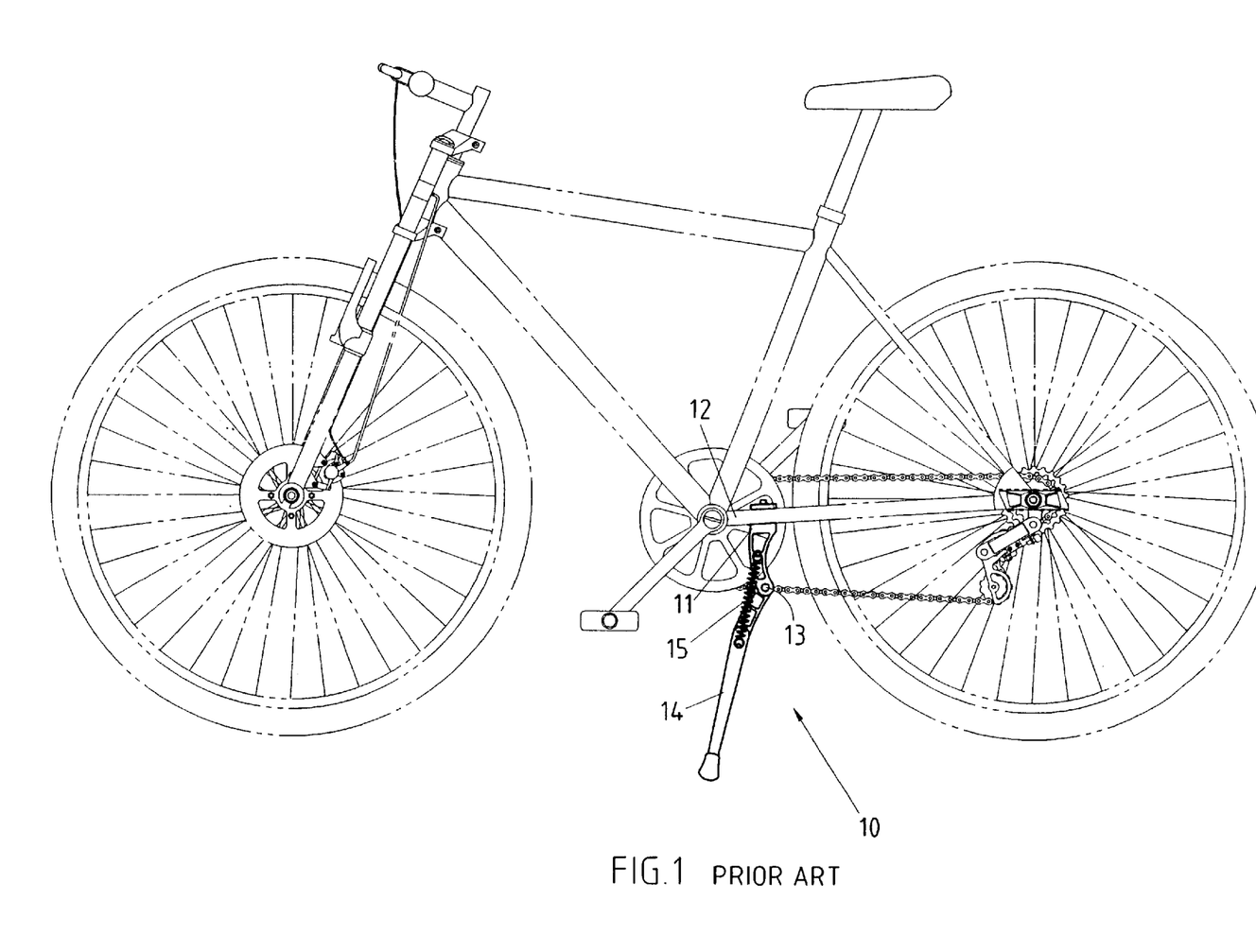
FIG. 1 shows a schematic view of a prior art bicycle support leg frame which is mounted on the chain stay of a bicycle.
Figure 2:
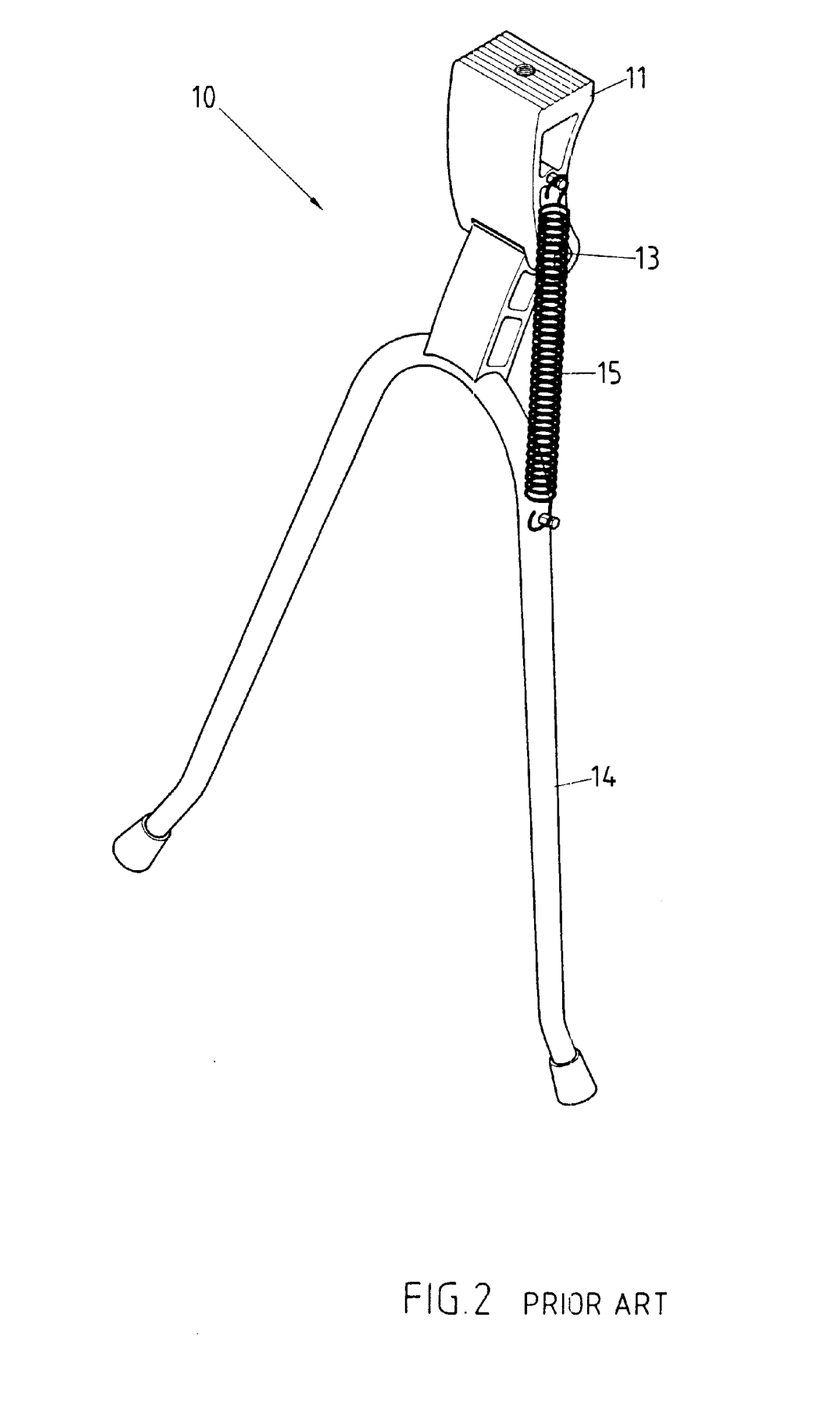
FIG. 2 shows a perspective view of the prior art bicycle support leg frame as shown in FIG. 1.
Figure 3:
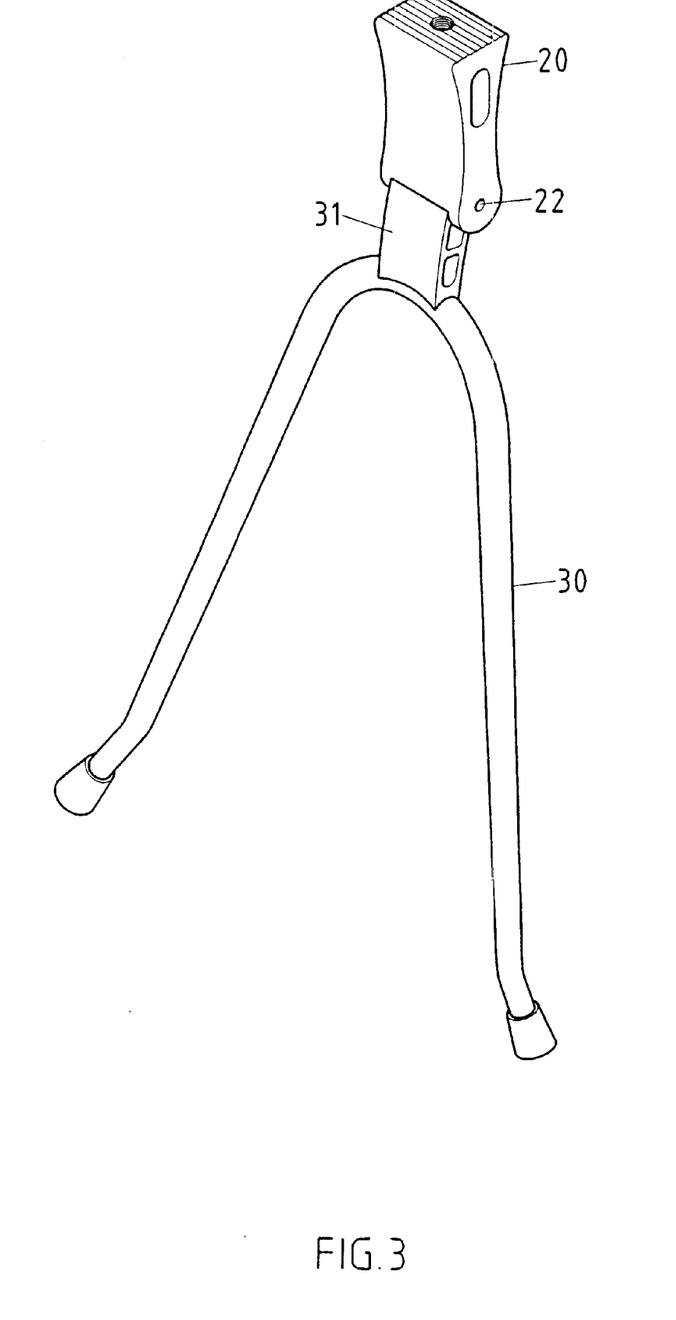
FIG. 3 shows a perspective view of a bicycle support leg frame of the preferred embodiment of the present invention.
Figure 4:
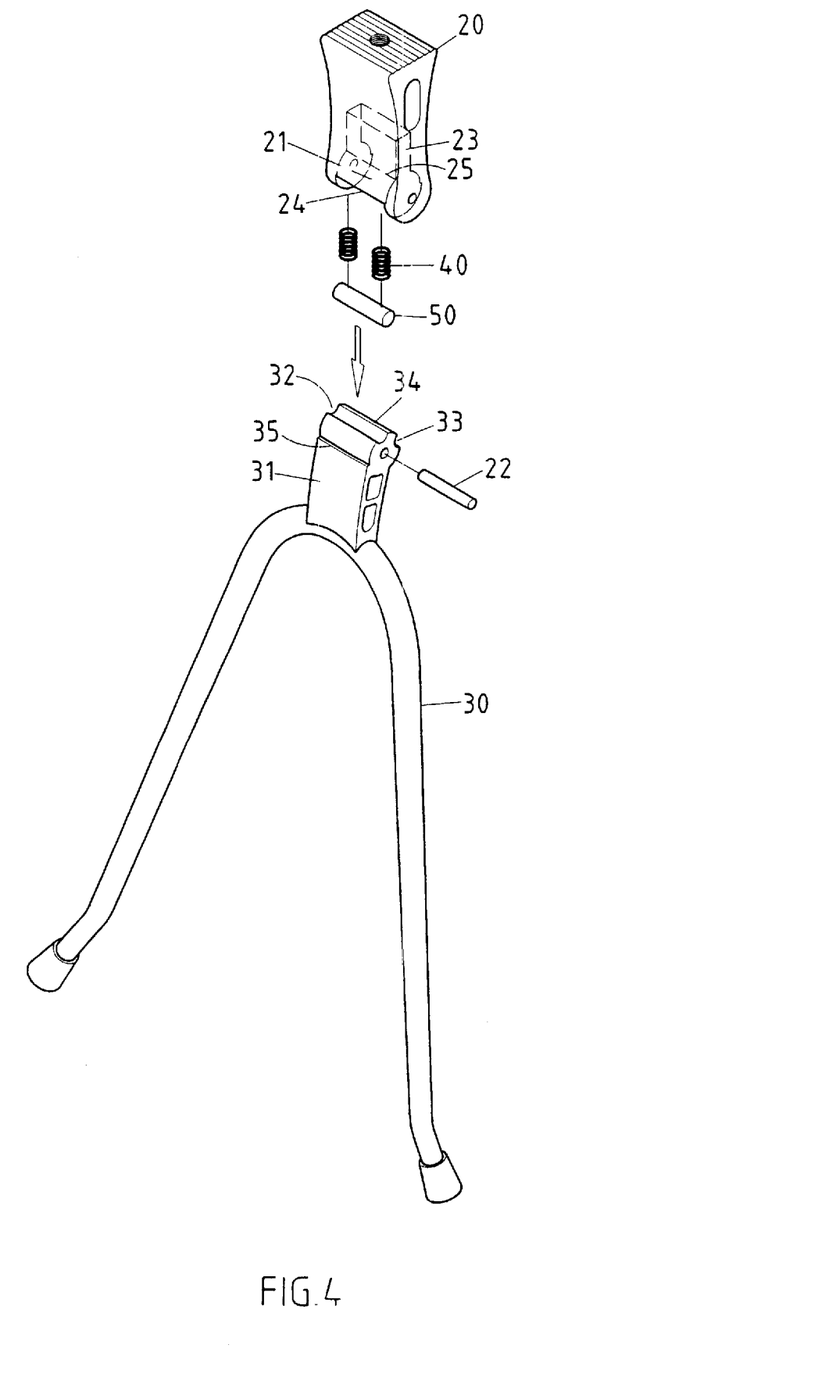
FIG. 4 shows an exploded view of the bicycle support leg frame of the preferred embodiment of the present invention.
Figure 5:
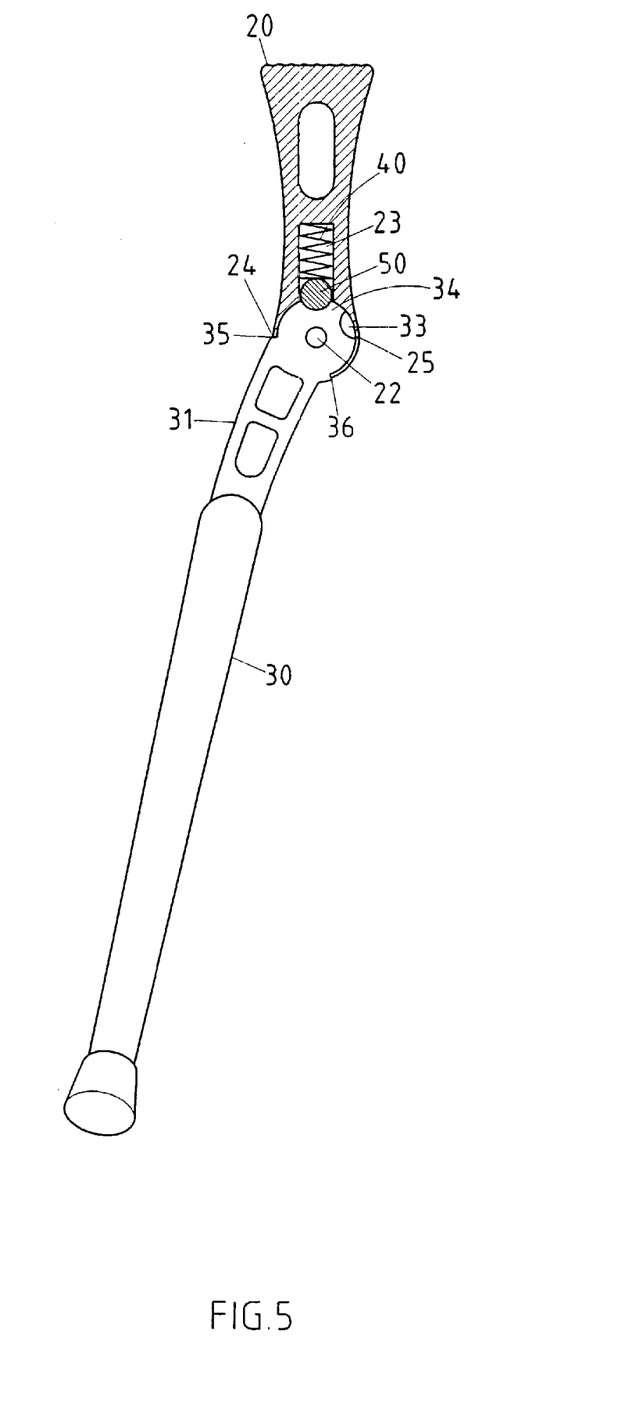
FIG. 5 shows a longitudinal sectional view of the bicycle support leg frame of the preferred embodiment of the present invention.
Figure 6:
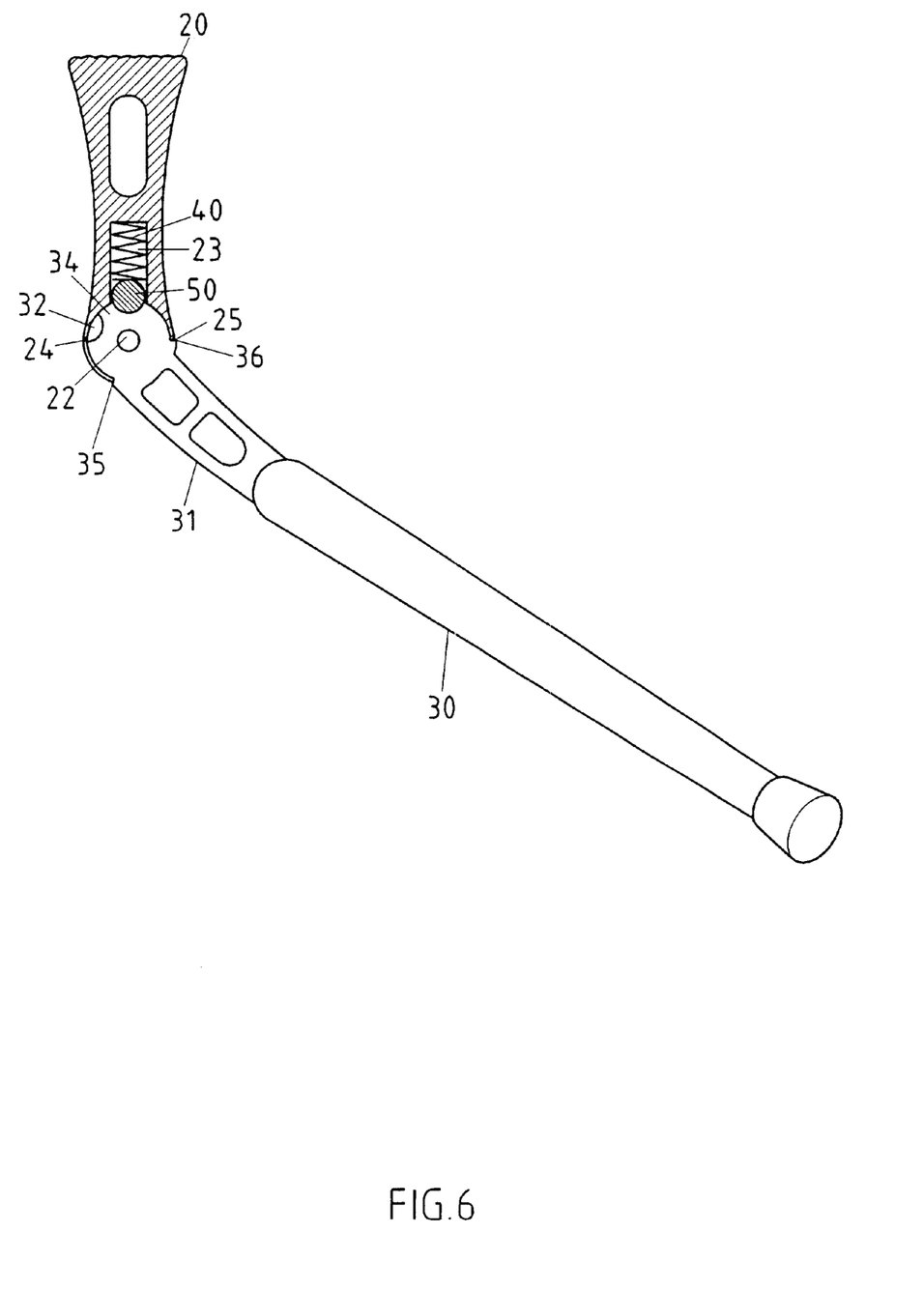
FIG. 6 shows another longitudinal sectional view of the bicycle support leg frame of the preferred embodiment of the present invention.
Figure 7:
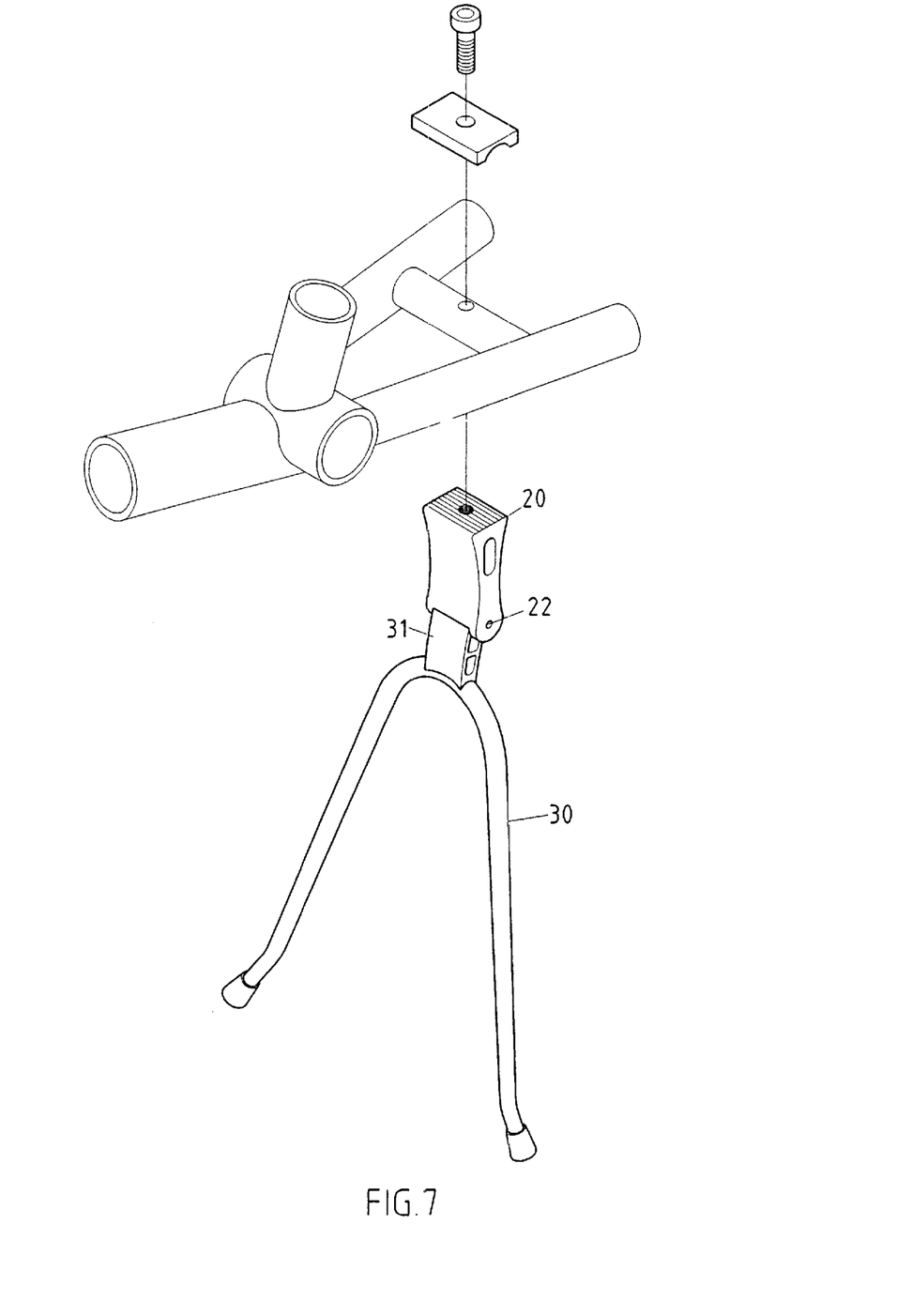
FIG. 7 shows a schematic view of the preferred embodiment of the present invention being fastened to a bicycle frame.
Figure 8:
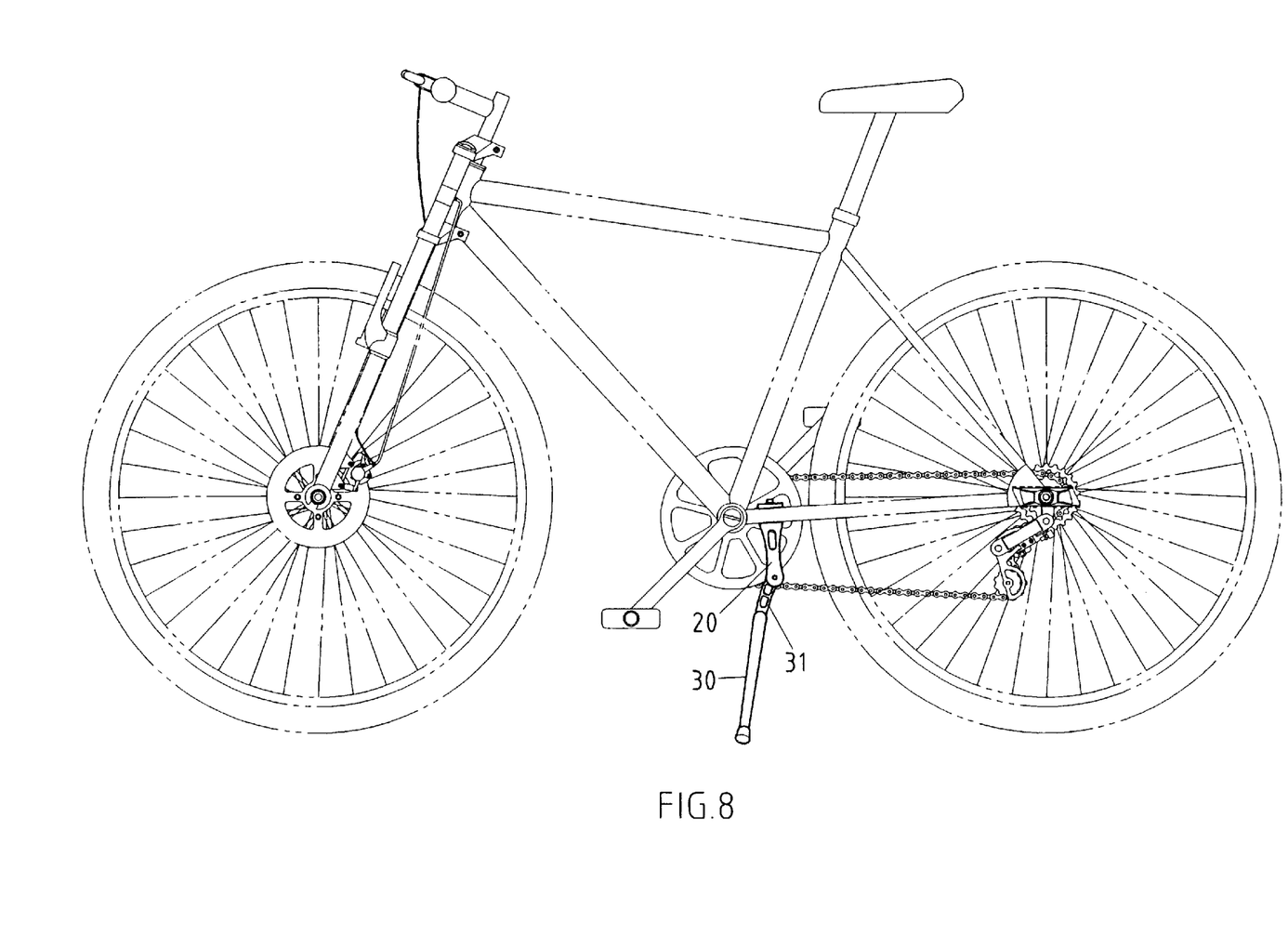
FIG. 8 shows a schematic view of the preferred embodiment of the present invention at work.

As shown in FIGS. 1 and 2, a support leg frame 10 of the prior art is fastened to a chain stay 12 of the bicycle and is formed of a fastening mount 11 and a leg 14 which is pivotally fastened to the fastening mount 11 by a pivot 13 in conjunction with a tension spring 15. The tension spring 15 is intended to position the leg 14; nevertheless it is exposed, thereby subjecting the tension spring 15 to rusting. The rusted tension spring 15 undermines not only the function of the support leg frame 10 but also the appearance of the support leg frame 10.

BRIEF SUMMARY OF THE INVENTION

The primary objective of the present invention is to provide a bicycle with a support leg frame which is free of the drawbacks of the bicycle support leg frame of the prior art described above.

In keeping with the principle of the present invention, the foregoing objective of the present is attained by a support leg frame comprising a mounting seat, a plurality of springs, and a leg. The support leg frame is mounted on the chain stay of a bicycle by the mounting seat, which is pivotally fastened to one end of the leg. The springs are disposed in the interior of the mounting seat.

The forgoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

As shown in FIGS. 3–8, a support leg frame of the preferred embodiment of the present invention is mounted on the chain stay of a bicycle such that the support leg frame is positioned in the proximity of the crank axle of the bicycle. The support leg frame comprises a mounting seat 20, a leg 30, and two tension springs 40.

The mounting seat 20 is mounted at one end thereof on the bicycle chain stay and is provided at an opposite end thereof with an inverted U-shaped slot 21 which is in turn provided with a cavity 23 smaller in inner width than the U-shaped slot 21. The cavity 23 is used to receive the springs 40.

The leg 30 is provided at the top end to a pivoting block 31 which is in turn provided at the top end with two recesses 32 and 33, and a partition 34 located between the two recesses 32 and 33. The partition 34 is raised. A small cylindrical bar 50 is disposed in the first recess 32. The leg 30 is pivotally fastened with the mounting seat 20 by the pivoting block 31 which is pivoted with the mounting seat 20 by a pivot 22 such that the top end of the pivoting block 31 is received in the inverted U-shaped slot 21 of the mounting seat 20, and that the springs 40 are compressed by the cylindrical bar 50. As the leg 30 is swiveled upward, the cylindrical bar 50 is caused to move across the partition 34 so as to be located in the second recess 33. When the leg 30 is swiveled back to its original position, the cylindrical bar 50 is caused to move across the partition 34 to return to the first recess 32. The pivoting block 31 is further provided with two stepped edges 35 and 36, which are respectively located in the proximity of the two recesses 32 and 33. When the leg 30 is swiveled to an extent, the two stepped edges 35 and 36 of the pivoting -block 31 of the leg 30 are stopped by two stop edges 24 and 25 at the bottom end of the mounting seat 20.

It must be noted here that the partition 34 of the pivoting block 31 of the leg 30 is so raised that it is higher than the two recesses 32 and 33 of the pivoting block 31.

When the leg 30 is swiveled upward, the pivoting block 31 is actuated to swivel in the slot 21 of the mounting seat 20. As a result, the cylindrical bar 50 is actuated to move across the partition 34. When the cylindrical bar 50 is in the midst of moving across the partition 34, the cylindrical bar 50 compresses the springs 40. As soon as the cylindrical bar 50 has moved across the partition 34, the cylindrical bar 50 is guided into the first recess 32 or the second recess 33 by the spring force of the compressed springs 40.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

I claim:

1. A support leg frame apparatus comprising:

a bicycle having a chain stay;

a mounting seat having a generally planar top end affixed to said chain stay of said bicycle, said mounting seat extending directly downwardly from said chain stay, said mounting seat having an inverted U-shaped slot extending across an opposite end of said mounting seat, said mounting seat having a cavity communicating with said inverted U-shaped slot, said cavity being smaller in inner width than an inner width of said inverted U-shaped slot, said mounting seat having a plurality of springs disposed in said cavity;

a leg having a generally inverted U-shaped configuration, said leg having a first leg portion and a second leg portion connected by a central portion;

a pivoting block having a bottom end affixed to said central portion, said pivoting block having a first recess and a second recess extending entirely across a top end thereof, said pivoting block having a partition extending upwardly between said first and second recesses;

a pivot pin extending through a hole in said pivoting block, said pivot pin having opposite end received by said mounting seat at respective opposite ends of said inverted U-shaped slot, said pivot pin extending in parallel relation to said top end of said mounting seat, said pivoting block pivotally mounted within said inverted U-shaped slot by said pivot pin; and a cylindrical bar resiliently mounted within said cavity of said mounting seat, said cylindrical bar releasably received within one of said first and second recesses, said plurality of springs being compressed against a surface of said cylindrical bar, said cylindrical bar being movable across said partition and between said first and second recesses relative to a movement of said leg between an extended bicycle-supporting position and a retracted position, said pivot pin extending generally parallel to said central portion between said first and second leg portions.

2. The apparatus of claim 1, said mounting seat having two stop edges, said pivoting block having two stepped edges respectively adjacent said first recess and said second recess, said two stepped edges being cooperative respectively with said two stop edges during the movement of said leg so as to limit a pivotal movement of said leg.

3. The apparatus of claim 1, said partition of said pivoting block extending outwardly of said pivoting block further than said first and second recesses.

* * * * *